United States Patent [19]

Starling et al.

[11] 3,863,523

[45] Feb. 4, 1975

[54] HYDRAULIC SAFETY SYSTEM FOR A VEHICLE TRANSMISSION

[75] Inventors: James G. Starling, Peoria; Harold A. Mathes, Tremont, both of Ill.

[73] Assignee: Caterpillar Tractor Co., Peoria, Ill.

[22] Filed: June 25, 1973

[21] Appl. No.: 373,246

[52] U.S. Cl............... 74/754, 74/753, 192/.09, 192/4 A
[51] Int. Cl........................ F16h 57/10, F16d 67/04
[58] Field of Search........ 74/753, 754; 192/4 A, .09

[56] References Cited
UNITED STATES PATENTS

| | | | |
|---|---|---|---|
| 3,181,394 | 5/1965 | Ramsel et al. | 74/753 X |
| 3,468,194 | 9/1969 | Horsch et al. | 74/753 |
| 3,527,326 | 9/1970 | Griffen | 74/753 X |
| 3,596,536 | 8/1971 | Starling | 74/753 |
| 3,633,440 | 1/1972 | Corrigan | 74/753 |
| 3,640,146 | 2/1972 | Barnes | 74/753 X |
| 3,709,065 | 1/1973 | Starling | 74/753 |

*Primary Examiner*—Samuel Scott
*Assistant Examiner*—P. S. Lall
*Attorney, Agent, or Firm*—Phillips Moore, Weissenberger, Lempio & Strabala

[57] ABSTRACT

A transmission control system includes controls for engaging speed ratio devices and directional devices. A safety valve functions to insure that initially, no fluid is supplied from a source to a speed ratio device unless the directional device control is in a neutral position. The safety valve shifts after a build up in pressure in such chosen speed ratio device. Such safety valve shift allows full pressure buildup in the speed ratio device, and also allows full pressure to be supplied to the chosen directional drive device upon shifting of the directional drive control from the neutral position.

6 Claims, 1 Drawing Figure

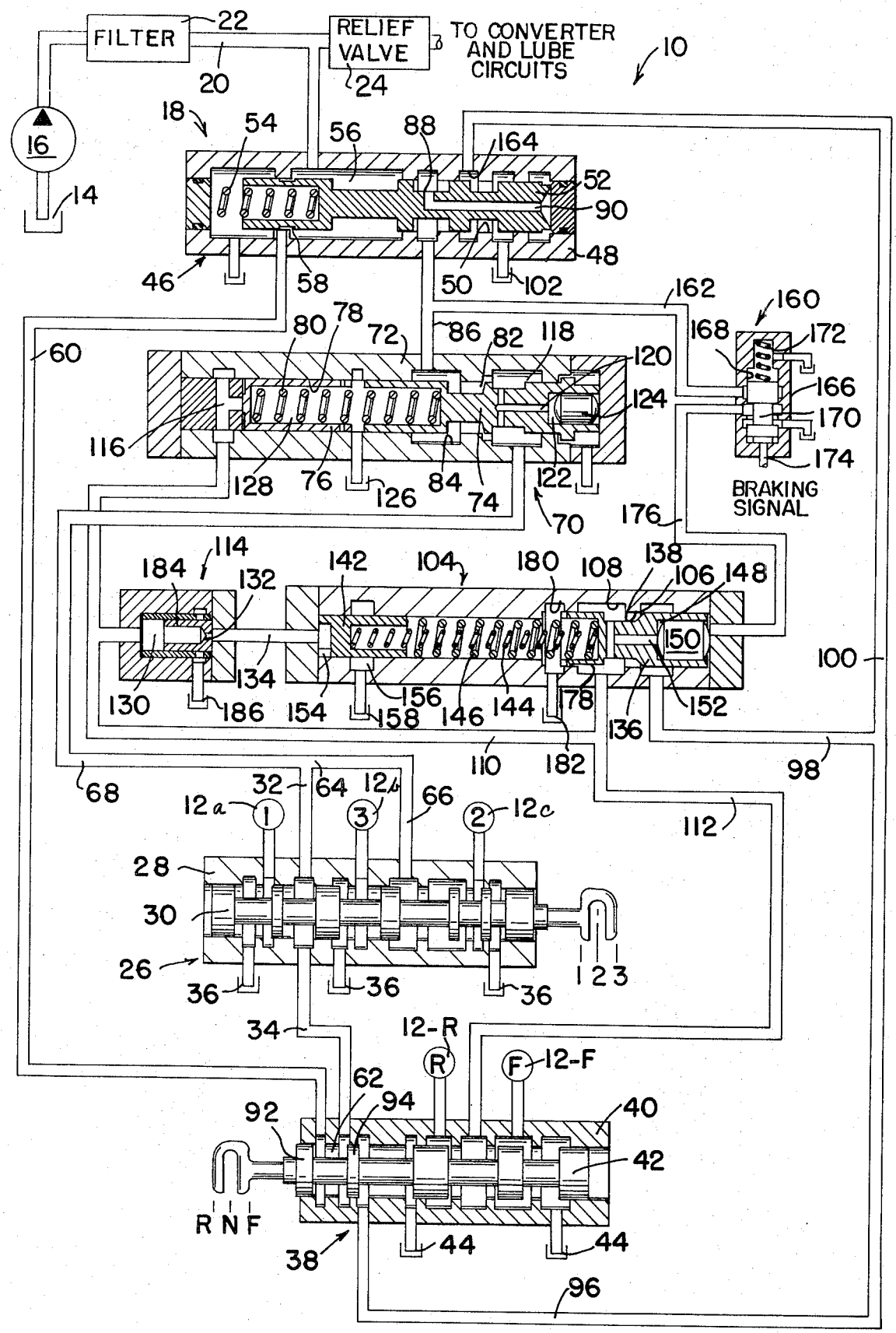

HYDRAULIC SAFETY SYSTEM FOR A VEHICLE TRANSMISSION

BACKGROUND OF THE INVENTION

This invention relates to drive transmissions for powered vehicles, and more particularly, to fluid pressure operated control systems for shifting such transmissions between drive ratios.

Generally, transmissions for tractor or vehicle use include a number of clutches or brakes which are actuated by fluid presssure to establish selective drive conditions within the transmission in response to movement of the vehicle operator's shift lever. Smooth, efficient shifting requires careful control and coordination of the pressure changes at the several clutches. This, in turn, requires a fairly complex pressure modulating system between the source of operating fluid and the selector valves which direct such fluid to the appropriate clutches. U.S. Pat. No. 3,481,435 to Pearce et al, (assigned to the assignee of this application) describes a highly efficient valve complex for this purpose.

For optimum performance and safety, a transmission control system should also provide certain functions in addition to such pressure modulation. For example, it can be hazardous to the operator and equipment if the vehicle should be started while the transmission controls are positioned in something other than the neutral position.

Toward this end, it is desirable to provide a safety device which prevents actuation of the mechanisms of the transmission when fluid pressure is first supplied to the system unless the shift control lever is in neutral, or until such time as the control lever is momentarily returned to neutral.

A patent of interest in this area is U.S. Pat. No. 3,596,536 to Starling (assigned to the assignee of this application). While such system as disclosed in that patent has proved to be relatively effective in operation, it is to be noted that the operation thereof depends on the operation fluid pressure remaining below a particular level for a predetermined time. To achieve this, a relatively complicated system of constrictions and passages is used.

Also of interest in this area are U.S. Pat. No. 3,091,976 to Johnson et al., U.S. Pat. No. 3,181,394 to Ramsel et al., U.S. Pat. No. 3,198,027 to Ramsel et al., U.S. Pat. No. 3,217,726 to Rohweder et al., U.S. Pat. No. 3,386,540 to Horsch et al., and U.S. Pat. No. 3,709,065 to Starling (all assigned to the assignee of this application).

SUMMARY OF THE INVENTION

It is an object of the invention to provide a control system for shifting a vehicle transmission, wherein the actuation of the selected one of the drive mechanisms of the transmission is prevented unless the transmission controls are positioned in the neutral position.

It is a further object of this invention to provide a control system for shifting a vehicle transmission which is simple in design and effective in operation.

Broadly stated, the invention is in combination with a transmission having a plurality of fluid pressure actuated drive conditioning devices including a first group of drive conditioning devices and a second group of drive conditioning devices, wherein application of fluid pressure to at least one device of each group establishes a selected one of a plurality of drive conditions through the transmission. The invention is a control system therefor comprising a source of fluid under pressure, and safety valve means having first and second positions. A first selector valve is included, communicating with the source with the safety valve means in its second position, and having a plurality of drive positions for directing fluid to predetermined ones of said first group of devices. Further included is a second selector valve communicating with the pressure source with the safety valve in its second position, and having a plurality of drive conditions for directing fluid to predetermined ones of the second group of devices, and further having a neutral position which cuts off fluid to all of the second group of the devices. The fluid pressure source communicates with the first selector valve with the safety valve means in its first position only when the second selector valve is in its neutral position, to direct fluid to the predetermined ones of the first group of devices. The safety valve means is biased into its first position to initially direct fluid from the fluid pressure source to the predetermined ones of the first group of devices only when the second selector valve is in its neutral position. Means are included for moving the safety valve means from its first position to its second position upon buildup of fluid pressure in the one of said first group of devices. The movement of the safety valve means to its second position provides the communication of the first and second selector valves with the source of fluid pressure.

BRIEF DESCRIPTION OF THE DRAWING

These and other objects of the invention will become apparent from a study of the following specification and drawing, which is a view, partially sectional and partially schematic, of a transmission shift control system embodying the invention.

DESCRIPTION OF THE PREFERRED EMBODIMENT

Referring to the drawing, a transmission control system 10 is shown with the components thereof in the positions assumed when the associated transmission has been shifted to neutral. Transmissions of the types to which the system 10 is applicable have a plurality of fluid pressure actuated drive conditioning devices 12, and selected devices 12 or combinations of such devices are actuated to realize particular gear settings.

In most multi-speed transmissions, certain ones of the drive conditioning devices 12, which may variously be clutches or brakes, are primarily for the purpose of realizing different speed ratios, and the other devices provide for selecting forward or reverse drive. In the present example, there are three clutches 12a, 12b and 12c constituting the group of speed clutches, and two clutches 12f and 12r which constitute the directional clutch group. To realize a particular gear setting in the transmission for which system 10 was designed, one clutch of each group is actuated. The internal construction of such clutches or brakes and their disposition and function in a transmission are well understood in the art and accordingly will not be further described herein.

Fluid under pressure for actuating the clutches 12 is provided from a reservoir 14 by a pump 16, driven by the vehicle engine, which delivers the pressurized fluid to a control valve group 18 through a conduit 20. Filter means 22 are included in the conduit 20. To maintain the pressure at the input of the valve group 18 at a constant, predetermined value, a relief valve 24 is connected between the conduit and the converter and lubrication circuits of the system.

A speed selector valve 26 is comprised of a housing 28 and spool 30 which may be shifted axially therein to direct fluid from an inlet conduit 32 or 34 to a selected one of the speed clutches. The valve 26 also vents the speed clutches to drain means 36 except at such times as a particular clutch is engaged.

A directional selector valve 38 is similarly included, with a housing 40 and an axially movable spool 42 to direct fluid to a selected one of the directional drive clutches 12f, 12r, which provide for either forward or reverse drive. The directional selector valve 38 also vents the particular one of the directional clutches which is not receiving working fluid to drain means 44. The directional selector valve 38 also includes a neutral position wherein fluid flow is cut off to all of the directional clutches, i.e., clutches 12f and 12r.

A safety valve is shown at 46. The safety valve 46 includes a housing 48 having a bore 50 therein, and a spool 52 that is movable axially therein. The spool 52 is movable to first and second positions, and is shown in the drawing in its first position, being biased into such position by means of a spring 54. In this position, fluid pressure from the conduit 20 enters a chamber 56 in the housing 48 and flows around an annular channel 58 defined by the spool 52. The fluid then flows through a conduit 60 to a second chamber 62 in the directional valve 38, up through conduits 34 and 32, dividing at a junction 64 to a conduit 66 to fill a speed clutch (in this case clutch 12c) to a predetermined low pressure of approximately 20 psi. After the speed clutch 12c is filled and begins to pressurize, fluid from the junction 64 then passes through the conduit 68 to a first pressure modulating reducing valve 70. The valve 70 consists of a housing 72, and a spool 74 and load piston 76 disposed in a bore 78 of the housing 72. A compression spring 80 extends between the spool 74 and load piston 76 to urge the two members towards their respective opposite ends of the bore 78. In the extended positions shown, the fluid flows across flow edge 82 to annulus 84, upward through conduit 86 to a second annular channel 88 defined by the safety valve spool 52. The safety valve spool 52 defines an axial bore 90 communicating with the channel 88 and extending therefrom in the direction in which the spool 52 is biased. The annular channel 88 is subjected to fluid pressure buildup during such initial direction of fluid from the source 14, 16 to the selected drive clutch 12c. Pressure in the annular channel 88 will act in the axial bore 90 and outward of the end of the spool 52 but within the housing 48 to overcome the bias of spring 54 and move the spool 52 into its second, leftward, position.

Upon the shifting of the safety spool 52 from its first to its second position, full fluid pressure is allowed to flow from the chamber 56 directly to the annular channel 88 to reverse fluid flow in conduits 86, 68, 32, 34 back to the directional valve 38. At this point, the original fluid flow path around the annular channel 58 is cut off.

In such case, the selector valves 26, 38 communicate with the source of fluid pressure 14, 16 through the safety valve 46, with the spool 52 thereof in its second position.

In the discussion thus far, the directional valve 38 is positioned in neutral as shown. Should the operator start the vehicle inadvertantly in either a forward or reverse position of the valve 38, the lands 92 or 94 defined by spool 42 will block pressure flow passing from the conduit 60 to the conduit 34 and hence will not fill the selected speed clutch nor activate the safety valve 46. The neutral position is located between the forward and reverse positions of the directional valve 38, and with the above-mentioned flow block when either the reverse or forward positions are assumed, it becomes necessary for the operator to move the spool 42 into neutral in order to first fill the selected speed clutch and activate the safety valve 46, in order to move the vehicle. That is, the source of fluid pressure 14, 16 communicates with the selector valve 26 with the safety valve 46 in its first position only when the selector valve 38 is in its neutral position. In addition, the safety valve 46, as explained above, is biased into its first position so that fluid is initially directed from the fluid pressure source 14, 16 to the predetermined one of the speed clutches only when the the selector valve 38 is in its neutral position.

With the valve 38 in the neutral position, and with the speed clutch 12c pressurized and safety spool 52 moved into its second, leftward position, the directional valve 38 is now ready for a shift in either direction. Moving the spool 42 of the directional valve 38 in either direction permits fluid flow from the the chamber 62 to flow through conduit 96 to branch further into the conduits 98, 100. With the safety spool now moved into an operating, leftward position, the conduit 100 is blocked from entering the drain 102. Therefore, fluid pressure from conduit 98 flows into a second pressure modulating reducing valve 104 across variable flow edge 106 to a chamber 108. From such chamber 108, pressure flows through conduits 110 and 112. Conduit 110 supplies pressure to a check valve 114 and also to the left end of the load piston 76 in the modulating reducing valve 70. Fluid pressure received in a chamber 116 applies a pressure signal to the end of the load piston 76 to move rightwardly against the spool 74 to permit flow across flow edge 82 and modulate pressure to the drive clutches to a pressure limit established by the relief valve 24. The spring force acting on spool 74 is opposed by the fluid pressure within chamber 118 in that a passage 120 in the spool 74 communicates pressure with chamber 122 on the right end of the spool 74 which has a reaction slug 124 therein. The region of the area of adjacent ends of the spool 74 and the load piston 76 is communicated with a drain 126, to vent chamber 128 through holes.

The conduit 110 as already mentioned is branched to a check valve 114 having a chamber 130 to permit flow through a restriction orifice 132 and conduit 134 into the left end of the modulating reducing valve 104. Valve 104 includes a spool 136 movable axially within a bore 138 and carrying edge 106 for controlling and varying flow passage and pressure to the directional clutches. A load piston 142 is also movable axially between a pair of compression springs 144, 146 to act between the load piston 142 and spool 136 in a direction tending to increase the flow passage past the edge 106. The force of springs 144, 146 on spool 136 is opposed by the fluid pressure downstream from edge 106 acting on the end of the spool 136 opposite the springs. For this purpose, a chamber 148 containing a reaction slug 150 in the end of the spool 136 is communicated with the chamber 108 downstream of edge 106 by a passage 152 in the spool 136. The flow restriction orifice 132 of check valve 114 controls the rate of rise of the pressure of both the selected drive clutch and the selected directional clutch as it controls the rate at which the load pistons 76, 142 moves rightwardly. When the pressure at the selected directional clutch has reached the predetermined maximum value, approximately 250 psi in this instance, the load piston 142 uncovers a slot 154 to an annulus 156 connected to a drain 158 so that pressure behind the load piston 142 cannot rise any further. Therefore, the pressure rise at the directional clutch stops at this maximum value and the shift is completed. The construction and operation of the pressure modulating valves 70, 104 is in accordance with the above mentioned U.S. Pat. No. 3,709,065.

In many control systems, it is desirable that the vehicle transmission also be automatically put into a neutral position when the vehicle brakes are applied, and the control system 10 may be adapted for this purpose. Referring again to the drawing, a neutralizer valve 160 has an inlet conduit 162 communicating with an annular groove 164 of the safety valve housing 48 to permit direct fluid flow from the pump 16. The neutralizer valve 160 consists of a housing 166 defining a bore 168 which contains a spool 170. The valve 160 is normally held closed by a spring 172 acting on the spool 170 thereof, but is opened when the vehicle brakes are applied by application of fluid pressure from the vehicle braking system to one end of the spool 170 through a braking signal conduit 174. When the operator applies the vehicle brakes, a pressure signal from the conduit 174 moves the spool 170 upward, permitting fluid pressure to flow from the conduit 162 into a conduit 176, applying fluid pressure to the end of spool 136 and slug 150, moving spool 136 leftwardly to block flow passage edge 106 and simultaneously reduce pressure in either engaged directional clutch. The pressure in the directional clutch is immediately reduced when spool 136, having flats 178, opens to annulus 180 and a drain 182. Likewise, springs 144 and 146 will move load piston 142 leftwardly, causing trapped fluid in conduit 134 to move valve 184 in check valve 114 leftwardly and open conduit 134 to drain 186.

What is claimed is:

1. In combination with a transmission having a plurality of fluid pressure actuated drive conditioning devices including a first group of drive conditioning devices and a second group of drive conditioning devices, and wherein application of fluid pressure to at least one device of each group establishes a selected one of a plurality of drive conditions through the transmission, a control system comprising:

a source of fluid under pressure;
safety valve means having first and second positions;
a first selector valve communicating with said source with the safety valve means in its second position, and having a plurality of drive conditions for directing fluid to predetermined ones of said first group devices;
a second selector valve communicating with said source with the safety valve means in its second position and having a plurality of drive positions for directing fluid to predetermined ones of said second group of devices, and having a neutral position which cuts off fluid to all of said second group of devices;
the source of fluid pressure communicating with the first selector valve with the safety valve means in its first position only when the second selector valve is in its neutral position, to direct fluid to the predetermined one of the first group of devices;
the safety valve means being biased into its first position to initially direct fluid from the fluid pressure source to the predetermined one of the first group of devices only when the second selector valve is in its neutral position;
means for moving the safety valve means from its first to its second position upon buildup of fluid pressure in the predetermined one of said first group of devices;
the movement of the safety valve means to its second position providing communication of the first and second selector valves with the source of fluid under pressure.

2. The combination of claim 1 wherein said safety valve means comprise a housing having a bore therein, and a spool that is movable axially therein to said first and second positions.

3. The combination of claim 2 wherein the safety valve spool defines first and second annular channels, the source communicating with the first selector valve with the safety valve means in its first position through the first annular channel, the source communicating with the first and second selector valves with the safety valve means in its second position through the second annular channel.

4. The combination of claim 3 wherein the second annular channel is subjected to fluid pressure buildup during the initial direction of fluid from the source to the predetermined one of the first group of devices with the safety valve means in its first position, and means for utilizing said fluid pressure buildup to overcome said bias to move said spool into its second position.

5. The combination of claim 4 wherein said safety valve spool defines an axial bore communicating with the second channel and extending therefrom in the direction in which the spool is biased, the pressure buildup in the second annular channel acting in the axial bore and outward of the end of the spool but within the housing to overcome the bias and move the spool into its second position.

6. The combination of claim 5 wherein the spool is biased into its first position by spring means.

* * * * *